Feb. 20, 1934.  F. HENNIG  1,947,937
DRIVE MECHANISM FOR TAXIMETERS
Filed March 14, 1931  2 Sheets-Sheet 1
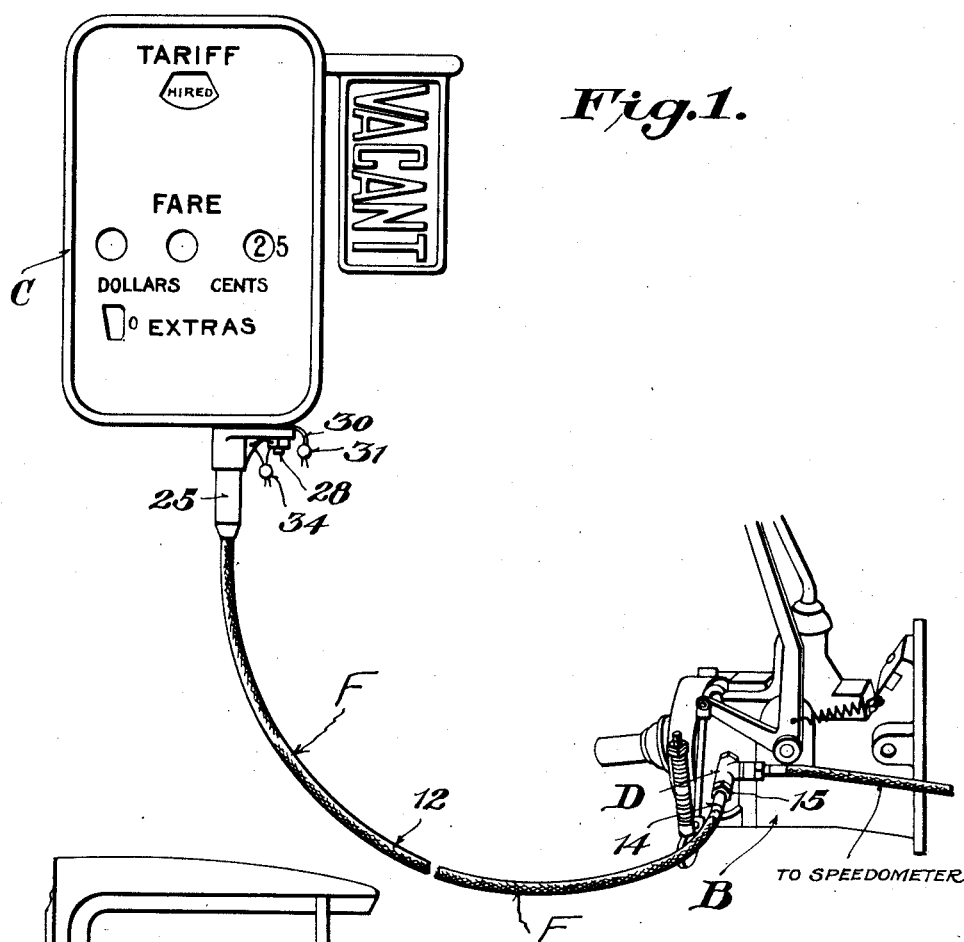
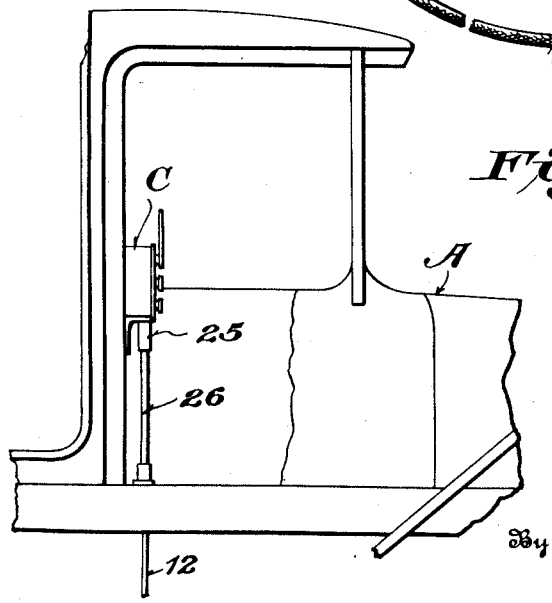
Inventor
Fred Hennig,
By D. P. Wolhaupter
Attorney Feb. 20, 1934. F. HENNIG 1,947,937
DRIVE MECHANISM FOR TAXIMETERS
Filed March 14, 1931 2 Sheets-Sheet 2
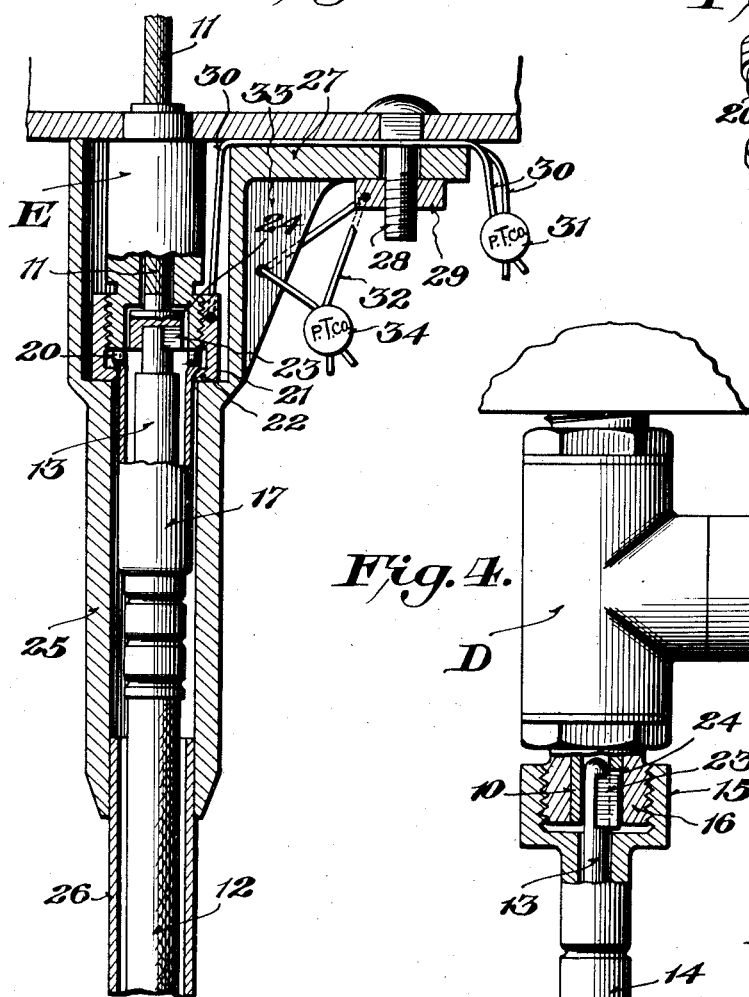
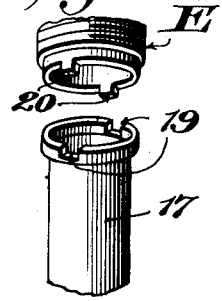
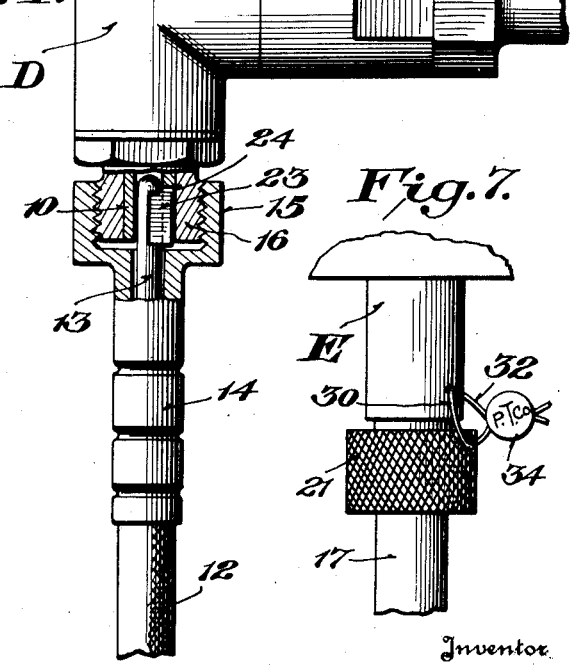
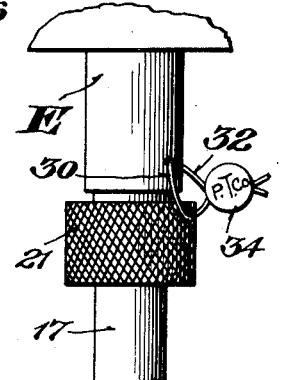
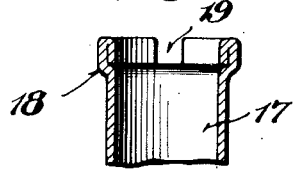
Inventor
Fred Hennig,
By D. P. Wolhaupter
Attorney Patented Feb. 20, 1934

1,947,937

UNITED STATES PATENT OFFICE 1,947,937

DRIVE MECHANISM FOR TAXIMETERS

Fred Hennig, Pittsburgh, Pa., assignor to Pittsburgh Taximeter Company, Pittsburgh, Pa., a corporation Application March 14, 1931. Serial No. 522,771

3 Claims. (Cl. 64—12)

This invention relates to a novel tamper-proof drive connection for taximeters and the like.

Heretofore, it has been customary to drive the meter mechanism of a taximeter by a flexible driving connection operated either from a wheel of the vehicle or from the transmission, and the present invention relates particularly to an improvement in the type of driving connection which receives its power from the transmission. According to prior practice drive connections of the type including a flexible casing and an interior drive shaft have been connected with the transmission driving extension by a coupling nut fitted to the casing in such a way that the application of the coupling nut to the transmission fitting necessitated the rotation of the coupling nut. On the other hand, the reverse rotation of the coupling nut would, of course, permit of removing the casing from the transmission fitting and also disconnecting the drive shaft from the meter. This objectionable feature has proved to be a source of detriment to the taxicab owner due to the fact that drivers could easily disconnect the driving means at the transmission thereby preventing registration of the meter and again reconnect the same when turning the cab in with little or no danger of detection due to the difficulty in inspecting the point of connection beneath the floor boards. Obviously this fraudulent tampering resulted in the loss of considerable tariff to the cab owner. Briefly, the present invention has the purpose in view of preventing the driver from detaching the driving conection at the transmission and furnishing a connection that cannot be detached without first breaking a seal up under the meter, which can be easily discovered by the cab owner without removing the floor boards of the cab.

Therefore, it is primarily the object of the present invention to provide a driving connection which may be applied in the usual manner to the transmission drive outlet, but which has at its other end a novel and positive locking means preferably associated with the meter, whereby it is impossible to disconnect the driving means at its junction with the transmission drive without breaking a seal or the like located conveniently for inspection at the meter end of the driving means. That is to say, the present invention has primarily in view a flexible drive connection which may be fitted to the transmission outlet in a simple and expeditious manner by a rotational movement while the end to be fitted to the taximeter is free, and then this free end may be locked to a stationary part of the meter by a non rotatable engagement to thus prevent removal of the exposed part by a reverse rotatable movement.

A further object of the invention is to provide a seal or seals which will deter tampering and effectually prevent the disconnection of the driving element at the transmission.

With the further object in view of providing a drive mechanism of the character mentioned which is of simple, inexpensive construction and which is thoroughly reliable and efficient in the performance of its functions, the invention consists in the novel features of construction, combination and arrangement of parts as will be hereinafter more fully described, illustrated in the accompanying drawings and defined in the appended claims.

In the drawings, wherein like characters of reference denote corresponding parts in the different views:—

Fig. 1 is a diagrammatic elevation of a taximeter drive mechanism constructed in accordance with one practical embodiment of the invention.

Fig. 2 is a fragmentary side elevation of a portion of a taxicab having a taximeter and illustrating one manner of housing the exposed portions of the present drive mechanism.

Fig. 3 is an enlarged sectional view through the taximeter end portion of the drive mechanism.

Fig. 4 is an enlarged sectional view through the end portion of the drive mechanism that is connected with the transmission gear of the taximeter.

Fig. 5 is a fragmentary perspective view illustrating means to prevent relative rotation between the casing of the flexible drive shaft and the part of the taximeter to which said casing is connected; and Fig. 6 is a detail sectional view of the end portion of the sleeve that is carried by one end of the casing of the flexible shaft.

Fig. 7 is a detail view illustrating the range of modification of the invention.

Referring to Figures 1 and 2, the taxicab A having the transmission housing B may be provided at the usual location with a taximeter C. The housing B is provided with a transmission driving connection D including a shaft 10 (Fig. 4) operatively related with a gear element of the transmission, and the taximeter C is provided with a stationary nipple E in which the meter drive shaft 11 is journalled.

The novel flexible driving connection designated generally as F includes a flexible casing 12 which is preferably woven from crossed strands of many fine wires, or is otherwise suitably constructed so as to effectively resist twisting thereof, thereby to prevent any appreciable rotation of the casing after it is once locked in place. The casing 12 houses a flexible drive shaft 13, and the transmission end of the casing has secured thereto a ferrule 14 having integral therewith a coupling nut 15 adapted for threaded engagement with the portion 16 of the support or fitting D. Clearly, assuming that the meter end of the casing 12 is free, the coupling nut 15 may be freely rotated together with the casing 12 to screw the transmission end of the casing onto the fitting D, the shaft 13 connecting with the member 10 in the manner hereinafter referred to.

The meter end of the casing 12 is provided with a ferrule 17 formed with an annular shoulder 18 having one or more recesses 19 therein. These recesses are adapted to receive one or more lugs 20 formed on the end of the stationary support or nipple E. Therefore, after the transmission end of the casing 12 has been fitted to the transmission fitting D by rotating the entire assembly 12, 14, 15, the ferrule 17 at the meter end may be interlocked with the stationary member E through the medium of the notches 19 and lug 20. This arrangement provides a non-rotative locking engagement at the meter end of the connection.

The ferrule 17 has sleeved thereon an interiorly threaded coupling nut 21 provided with the shoulder 22 for engaging with the shoulder 18 of the ferrule whereby when the nut 21 is screwed into threaded engagement with the exteriorly threaded outer end of the nipple E, the ferrule 17 will be securely locked to the nipple E. Therefore, it will be impossible to rotate the ferrule 17 and the casing 12 by manipulating the coupling 15 at the transmission end of the casing, thereby eliminating the possibility of the driver disconnecting the entire driving connection F by unscrewing the coupling 15 from the transmission fitting and disconnecting the flexible drive shaft 13 from the member 10. As will presently appear, the coupling nut 21 at the meter end of the flexible driving means F is properly safeguarded against tampering.

The ends of the flexible shaft 13 are provided with keys 23 to fit in key-ways or recesses 24 in the shafts 10 and 11, respectively, or other suitable interfitting formations are provided in or on the ends of said shafts 10, 11 and 13 whereby the shaft 13 serves to operatively connect the shafts 10 and 11 together when the nut 15 of the ferrule 14 is connected with the fitting D and the nut 21 is operatively engaged with the nipple E.

Preferably, a housing 25 is provided to enclose the protruding end portion of the nipple E, the nut 21, the ferrule 17 and the upper end portion of the flexible non-rotatable casing 12, as well as to form a support for the upper end portion of a housing tube 26 which preferably is provided to enclose the casing 12 above the floor board of the taxicab, but, of course, the use of the housing 25 and the tube 26 is optional and these elements may be dispensed with if desired. The tube 26 fits into the lower end of the housing 25 and the latter is provided at its upper end with a lateral flange or projection 27 which is apertured to receive a stud or bolt 28 carried by a portion of the taximeter or by the supporting bracket of the meter, and a nut 29 is provided for engagement with said stud or bolt to secure said housing in place.

For sealing the nut 21 a wire 30 may be passed through an aperture suitably located in said nut and said wire may then be suitably engaged with the stud or bolt 28 and finally sealed as indicated at 31, while in order to seal the nut 29 a wire 32 may be passed through an aperture in said nut and through an aperture in a web or lug 33 formed integral with the housing 25 and the ends of said wire may then be brought together and sealed as indicated at 34.

While sealing of the nut 29 is not essential, said nut preferably is sealed to prevent removal of the housing 26 and any tampering with the nut 21, and in this connection it will be apparent that in lieu of the specific manner of sealing the nuts 21 and 29 herein disclosed, any other suitable or preferred means of sealing said nuts may be employed.

In establishing the operative relation between the transmission gear and the taximeter by means of the novel drive connection F, the shaft 13 is first keyed into the shaft 10 and then the coupling nut 15 with its attached casing 12 is rotated to thread the coupling onto the fitting D. The meter end of the drive connection F is then ready to be connected to the stationary ferrule E. The ferrule 17 is moved toward the end of the nipple E so that the notches 19 receive the lugs 20 and the interiorly threaded coupling nut 21 is then screwed onto the nipple E so that the shoulder 22 of the coupling nut firmly holds the ferrule to the fixed meter part. Since the flexible casing 12 cannot be twisted and the nut 15 is not rotatable with respect to the casing, and the casing is held against relative rotation to the nipple E by the interlocking means just described, the unscrewing of the nut 15 from the fitting D, or the unscrewing of the fitting from the housing of the transmission gearing is impossilbe without first unscrewing the nut 21 and disengaging the ferrule 17 from the nipple. As the nut 21 is sealed against being unscrewed when the same is tightened, it is apparent that it will be impossible to effect disconnection of the driving means F between the transmission and the taximeter without first breaking the seal or seals previously described.

It will be noted that the fitting D illustrated in the present instance is of the so-called dual type having two outlets, one for connection with a taximeter and the other for connection with a speedometer. However, the present invention is not limited to use in connection with a dual outlet fitting but may be attached direct to the transmission outlet. In fact it is of general application wherever one end of a hollow casing is to be screwed on to a nipple while the other end is to be locked to prevent fraudulent manipulation and removal of the exposed rotatable end.

A distinctive feature of the invention resides in the provision of the flexible casing F, specifically designated as 12, the said flexible casing being so made that it cannot be twisted or rotated any appreciable amount, and having at one end the rigid coupling nut 15 for connection with the transmission housing, and having at its other end a rotatable coupling nut 21 which may be screwed onto the threaded portion of the supporting nipple E carried by the meter.

This construction permits of rotating the entire flexible casing F to enable the coupling 15 carried therewith to be fitted to the transmission fitting D, and when this end of the casing has been made fast, the rotatable coupling nut 21 at the other end may be then easily screwed onto the nipple E. This nut may then be locked by the sealing element so that it cannot be removed without detection. In that connection the sealing wire 30 which passes through the nut 21 may be either anchored as shown in Figure 3, or, if desired, the nipple F may be provided with an opening through which the sealing wire may be passed as shown in Figure 7.

Without further description it is thought that the features and advantages of the invention will be readily apparent to those skilled in the art, and it will of course be understood that changes in the form, proportion and minor details of construction may be resorted to without departing from the spirit of the invention and scope of the appended claims.

I claim:—

1. A drive mechanism of the character described comprising, in combination, a device to be driven, a power shaft, a housing element enclosing said shaft, a flexible shaft drive connection between said power shaft and said device, a flexible casing housing said flexible shaft, a ferrule rigid with one end of said casing and threaded to said housing element, a ferrule rigid with the other end of said casing and non-rotatably interlocked with a part of the device to be driven, a nut securing the last mentioned ferrule in interlocked engagement with said device part, and means for sealing said nut.

2. A drive mechanism of the character described comprising, in combination, a device to be driven, a power shaft, a housing for said shaft, a fitting threaded into said housing, a shaft within said fitting adapted to be driven by said power shaft, a threaded member extending from the device to be driven, a shaft within said member, a shaft connecting said power shaft with the shaft within said member, a casing for said last mentioned shaft, a ferrule fixed to one end of said casing and threaded to said fitting, a ferrule fixed to the other end of said casing, interfitting formations between said second mentioned ferrule and said member preventing relative rotation between said ferrule and said member, a nut for holding said last mentioned ferrule in operative engagement with said member, and means for sealing said nut.

3. A tamperproof housing for the drive shaft of taximeters adapted to connect a concealed point of shaft attachment with an exposed point of shaft attachment adjacent the meter, comprising in combination, a threaded nipple associated with the transmission housing, a rigid member on the taximeter housing, a tubular casing member for housing said flexible drive shaft, said tubular casing member being made of non-twistable material, a coupling rigidly fixed to said casing adapted to be secured on the nipple while the casing is free at its other end, and means rigidly secured to the last mentioned end of the casing having a crosswise key engagement with said rigid member on the taximeter housing, whereby such engagement prevents rotation of the casing.

FRED HENNIG.